United States Patent
Ohhashi et al.

(10) Patent No.: US 8,824,035 B2
(45) Date of Patent: Sep. 2, 2014

(54) MOLDED PLASTIC PART, METHOD FOR MOLDING PLASTIC PART, AND OPTICAL SCANNING DEVICE USING THE MOLDED PLASTIC PART

(75) Inventors: Takamichi Ohhashi, Kanagawa-ken (JP); Yasuo Yamanaka, Tokyo (JP); Akio Hirano, Kanagawa-ken (JP); Eiichi Hayashi, Kanagawa-ken (JP); Go Takahashi, Kanagawa-ken (JP); Kan Aoki, Kanagawa-ken (JP)

(73) Assignee: Ricoh Company, Limited, Tokyo (JP)

( * ) Notice: Subject to any disclaimer, the term of this patent is extended or adjusted under 35 U.S.C. 154(b) by 724 days.

(21) Appl. No.: 12/960,938

(22) Filed: Dec. 6, 2010

(65) Prior Publication Data

US 2011/0164295 A1    Jul. 7, 2011

(30) Foreign Application Priority Data

Jan. 6, 2010    (JP) .................................. 2010-001272

(51) Int. Cl.
*G02B 26/08* (2006.01)
*B29D 11/00* (2006.01)

(52) U.S. Cl.
USPC .......... 359/204.1; 359/662; 264/1.1; 425/808

(58) Field of Classification Search
CPC ............... B29L 2011/0016; B29L 2011/0058; B29D 11/00009; B29D 11/00413; B29C 45/56; B29C 45/0025; G02B 3/00; G02B 13/0005; C03B 11/08; C03B 19/025; C03B 2215/48; C03B 2215/49

USPC ............ 264/1.1, 1.32, 2.3, 2.2; 425/404, 555, 425/808; 359/662, 796, 204.1–208.2
See application file for complete search history.

(56) References Cited

U.S. PATENT DOCUMENTS

| 6,015,514 A | 1/2000 | Koseko |
| 6,702,565 B1 | 3/2004 | Kanematsu et al. |

(Continued)

FOREIGN PATENT DOCUMENTS

| CN | 1188708 A | 7/1998 |
| CN | 1699042 A | 11/2005 |

(Continued)

OTHER PUBLICATIONS

Combined Office Action and Search Report issued Mar. 28, 2013 in Chinese Patent Application No. 201110004279.7 with English translation of categories of cited documents.

(Continued)

*Primary Examiner* — James Phan
(74) *Attorney, Agent, or Firm* — Oblon, Spivak, McClelland, Maier & Neustadt, L.L.P.

(57) ABSTRACT

A molded plastic part prepared by injecting a resin in a cavity of a die so that a pressure is generated in the resin in the cavity and at least one transfer wall surface of the cavity is transferred to the resin. The plastic part has at least one transferred surface; at least one imperfectly transferred concave portion on a first surface thereof other than the transferred surface; and at least one imperfectly transferred convex portion on the first surface or a second surface thereof other than the transferred surface. The ratio (a)/(b) of the thickness (a) of the plastic part in a direction perpendicular to the transferred surface to the thickness (b) of the plastic part in a direction parallel to the transferred surface is less than 1.

11 Claims, 9 Drawing Sheets

(56) References Cited

U.S. PATENT DOCUMENTS

| | | |
|---|---|---|
| 6,801,374 B2 | 10/2004 | Kuroda et al. |
| 6,919,120 B2 | 7/2005 | Yamanaka et al. |
| 7,794,643 B2 | 9/2010 | Watanabe et al. |
| 2004/0145090 A1* | 7/2004 | Kanematsu et al. .......... 264/500 |
| 2004/0253337 A1 | 12/2004 | Hashimoto et al. |

FOREIGN PATENT DOCUMENTS

| | | |
|---|---|---|
| CN | 101041258 A | 9/2007 |
| JP | 6-304973 | 11/1994 |
| JP | 2000-329908 | 11/2000 |
| JP | 2001-219438 | 8/2001 |
| JP | 2002-254466 | 9/2002 |
| JP | 2002-326260 | 11/2002 |
| JP | 2002-347079 | 12/2002 |
| JP | 2003-11191 | 1/2003 |
| JP | 2003-89136 A | 3/2003 |
| JP | 2003-241083 | 8/2003 |
| JP | 3512595 | 1/2004 |
| JP | 2004-114628 | 4/2004 |
| JP | 2006-51822 | 2/2006 |
| JP | 2006-133709 | 5/2006 |
| JP | 2006-256247 | 9/2006 |
| JP | 3867966 | 10/2006 |
| JP | 4017927 | 9/2007 |
| JP | 2007-283752 | 11/2007 |
| JP | 2007-331206 | 12/2007 |
| JP | 4053716 | 12/2007 |
| JP | 4108195 | 4/2008 |
| JP | 2008-139330 | 6/2008 |
| JP | 4462998 | 2/2010 |

OTHER PUBLICATIONS

Combined Chinese Office Action and Search Report issued Dec. 12, 2013, in Chinese Patent Application No. 201110004279.7 with English translation of category of cited documents.

\* cited by examiner

MOLDED PLASTIC PART, METHOD FOR MOLDING PLASTIC PART, AND OPTICAL SCANNING DEVICE USING THE MOLDED PLASTIC PART

BACKGROUND OF THE INVENTION

1. Field of the Invention

The present invention relates to a molded plastic part. In addition, the present invention also relates to a method for molding a plastic part, and to an optical scanning device using the molded plastic part.

2. Description of the Related Art

Conventionally, injection molding methods for use in molding a plastic part, which include injecting a raw material of resin or a melted resin into a certain-volume cavity of an openable die heated to a thermally-deformable temperature of the resin, gradually cooling the resin while controlling the pressure on the resin, and then opening the die to obtain a molded part, are known.

By using such an injection molding method, a plastic part having a complex form can be mass-produced at a low cost as long as a die suitable for producing the part is used. However, since optical elements such as lenses and prisms are required to have high precision in shape of the optical surface thereof and not to induce birefringence in the inner portion thereof, glass has been typically used for such optical elements. According to a recent need for low-cost optical elements (such as lenses and mirrors), the constituent material of such optical parts has been changed from glass to plastics.

There are a variety of molded plastic parts with respect to shape. For example, there is a molded plastic part having a thin portion which is formed by contacting a transfer surface of a die and whose surface has fine convex and concave portions. When such a plastic part is prepared using a die, the die is required to have a high-precision transferability. Particularly, elements (such as lenses) used for optical scanning systems of image forming apparatus such as laser printers have to carry out multiple functions to minimize the number of elements (lenses). Therefore, such elements typically have complex non-spherical mirror surfaces as well as spherical mirror surfaces. In addition, such parts typically have thin-walled shapes to meet space-saving requirements therefor.

When molding such a thin-walled plastic part using a die, it is preferable to maintain the pressure on the resin injected into the cavity of the die and the temperature of the resin so as to be constant in the cooling process in which the melted resin in the cavity is cooled to solidify, in order to prepare a molded plastic part with high dimensional precision. However, in a thin portion of such a plastic part as illustrated in FIG. 1, which has an aspect ratio (i.e., a ratio (a)/(b) of a thickness (a) of the thin portion having a cross section 14 in a first direction perpendicular to a transferred surface of the plastic part to a thickness (b) thereof in a direction parallel to the transferred surface in FIG. 1) of less than 1, the cooling speed in the first direction is faster than that in the second direction, thereby cooling and solidifying the molded plastic part while keeping the pressure on the resin at the transfer wall surface of the cavity (die), resulting in occurrence of problems in that, due to internal stress of the solidifying resin, the molded plastic part is deficiently released from the die (for example, part of the molded part is adhered to the transfer wall surface of the cavity), and the molded plastic part is deformed (bent) after released from the die. Particularly, plastic parts prepared by such a molding method tend to induce a birefringence phenomenon due to internal strain. Hereinafter, a molded plastic part having a thin portion having an aspect ratio (a)/(b) of less than 1 is referred to as a thin-walled plastic parts.

In a case of such a thin-walled plastic part as illustrated in FIG. 4, which has fine convex and concave portions on a transferred surface thereof, it is necessary to increase the pressure in injecting a resin into the cavity so that the injected resin can be satisfactorily contacted with the transfer wall surface of the cavity for forming the convex and concave portions on the plastic part. When the injected resin is cooled, large internal stress (residual pressure) remains in the molded plastic part, resulting in deformation of the molded plastic part and/or occurrence of a birefringence phenomenon when the plastic part is used as an optical element). In this regard, in order to reduce the residual pressure, the injection molding has to be performed while decreasing the injection pressure. However, when low-pressure injection molding is performed, the volume of the injected resin is decreased so as to be relative small compared to the volume of the cavity, thereby forming a sink on a transferred surface of the resultant molded plastic part after the resin solidifies, resulting in deterioration of transfer precision (i.e., preparation of a part having an undesired shape due to volume contraction).

In attempting to solve the sink formation problem in low-pressure injection molding, there is a proposal for a die in which air is applied from an air hole to a non-transferred surface of a resin to generate pressure difference between a transferred surface and the non-transferred surface so that a sink is formed on the non-transferred surface while preventing formation of a sink on the transferred surface.

In addition, there is a proposal for a molding method in which at least one of cavity pieces forming a cavity is slid at a proper time in a molding operation to separate a non-transferred surface of the resin therefrom, i.e., to form an air gap therebetween, so that a sink is formed on the non-transferred surface while preventing formation of a sink on the transferred surface.

Further, there is a proposal for a molding method for molding a thick part or a part having uneven thickness, in which the injected resin is subjected to imperfect transfer at a surface of a cavity of a die other than a transfer surface thereof to forcibly form a sink on the imperfectly transferred surface while preventing formation of a sink on a transferred surface.

The above-mentioned techniques are not suitable for molding thin-walled plastic parts.

In addition, recently, the requirements for such molded plastic parts (such as plastic optical elements) become severe and severe to produce higher-quality optical images using such molded plastic parts.

For these reasons, the inventors recognized that there is a need for a molded thin-walled plastic part which can exhibit good optical property when used for optical scanning systems without causing the sink formation problem and the birefringence phenomenon.

SUMMARY

This patent specification describes a novel molded plastic part which is prepared by injecting a resin in a cavity of a die so that a pressure is generated in the resin in the cavity and at least one transfer wall surface of the cavity (die) is transferred to the resin. The molded plastic part satisfies a relation (a)/(b)<1, wherein (a) represents the thickness of the plastic part in a direction perpendicular to the transferred surface of the plastic part, and (b) represents the thickness of the plastic part in a direction parallel to the transferred surface. In addition, the molded plastic part has not only the at least one transferred surface but also at least one imperfectly transferred concave portion on a first surface other than the transfer surface and at least one imperfectly transferred convex portion on the first surface or a second surface other than the transferred surfaces.

This patent specification further describes a novel method for molding a plastic part, which includes injecting a resin into a cavity of a die having at least one transfer wall surface, at least one movable wall surface, and at least one imperfect transfer wall surface while generating a pressure in the resin in the cavity so that the transfer wall surface of the cavity is transferred to the resin to form at least one transferred surface on the resin; and, at a time a predetermined period of time after injection of the resin, sliding the movable wall surface so as to be separated from the cavity to form an imperfectly transferred convex portion on a first surface of the resin while feeding compressed air from the imperfect transfer wall surface to the resin to release the resin from the imperfect wall surface by priority to form an imperfectly transferred concave portion on the first surface or a second surface of the resin other than the transferred surface.

Alternatively, instead of feeding compressed air, the imperfect transfer surface may have a lower adhesiveness than the other surfaces of the cavity, so that the imperfectly transferred concave portion is formed on the first or second surface of the resin other than the transferred surface.

BRIEF DESCRIPTION OF THE DRAWINGS

A more complete appreciation of aspects of the invention and many of the attendant advantage thereof will be readily obtained as the same become better understood by reference to the following detailed description when considered in connection with the accompanying drawings, wherein.

DESCRIPTION OF THE PREFERRED EMBODIMENTS

Initially, the molded plastic part of the present invention will be described.

The molded plastic part of the present invention is prepared by injecting a resin in a cavity of a die so that a pressure is generated in the resin in the cavity and at least one transfer wall surface of the cavity (die) is transferred to the resin. The molded plastic part satisfies a relation (a)/(b)<1, wherein (a) represents the thickness of the plastic part in a direction perpendicular to the transferred surface of the plastic part, and (b) represents the thickness of the plastic part in a direction parallel to the transferred surface. In addition, the molded plastic part has not only the at least one transferred surface but also at least one imperfectly transferred concave portion on a first surface other than the transfer surface and at least one imperfectly transferred convex portion on the first surface or a second surface other than the transferred surfaces.

By injecting a resin into a cavity so as to generate an internal pressure therein to transfer a transfer wall surface of the cavity to the resin and forming an imperfectly transferred convex portion on a surface of a resin other than the transferred surface thereof, it becomes possible to reduce the internal pressure in the resin. In addition, by forming an imperfectly transferred concave portion on the surface or another surface of the resin, it becomes possible that the concave portion absorbs a sink, which is formed due to negative pressure formed when the internal pressure is reduced. Further, since the molded plastic part is a thin-walled plastic part, the injected resin solidifies while keeping the pressure reduction state. Therefore, even when molding a thin-walled plastic part, it becomes possible to reduce the residual internal stress, thereby forming a plastic part having the desired shape and the transferred surface while preventing deformation of the molded plastic part caused when or after the molded plastic part is released from the die.

Next, a first example of the molded plastic part of the present invention will be described.

Figure 1:
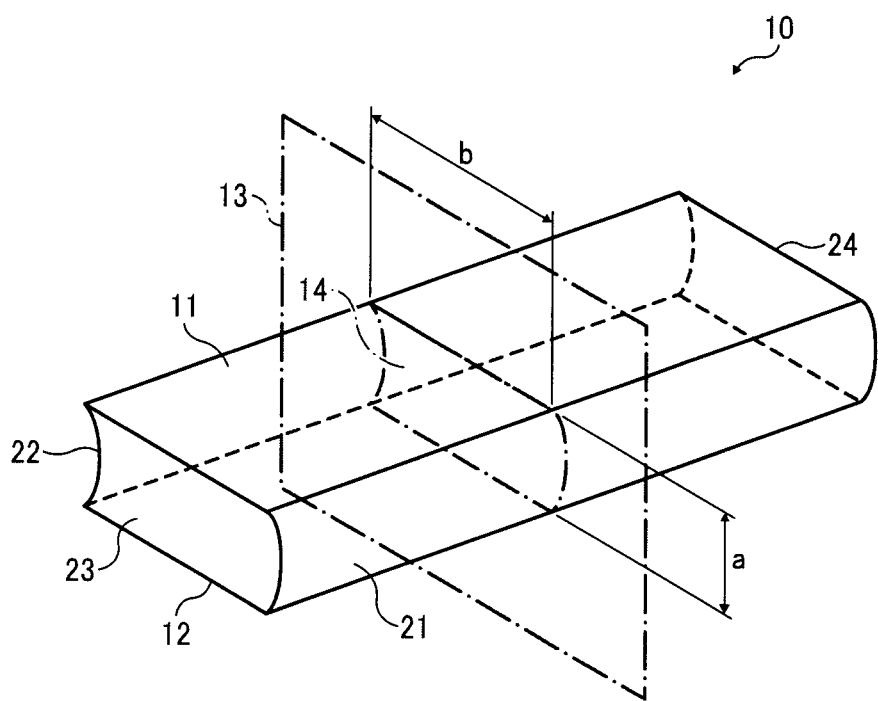
FIG. 1 is a perspective view illustrating an example of the molded plastic part of the present invention.

FIG. 1 is a perspective view illustrating the first example of the molded plastic part. Referring to FIG. 1, a molded plastic part 10 has a first transferred surface 11 and a second transferred surface 12 on the upper and lower sides thereof, respectively. In addition, the plastic part 10 has an imperfectly transferred convex portion 21 and an imperfectly transferred concave portion 22, which is opposed to the imperfectly transferred convex portion 21, on longer side surfaces thereof. Other side surfaces 23 and 24 of the molded plastic part 10 are not particularly limited, and may be transferred surfaces formed by transferring wall surfaces of the cavity of the die or imperfectly transferred surfaces formed by imperfectly transferring wall surfaces of the cavity.

The molded plastic part 10 is a thin-walled plastic part, and a cross section 14 of the plastic part on a plane 13, which is illustrated by a chain line in FIG. 1 and which is perpendicular to the transferred surfaces 11 and 12, satisfies the following relation (1):

$$(a)/(b)<1 \tag{1},$$

wherein a represents the thickness of the plastic part in a direction perpendicular to the transferred surfaces 11 and 12, and (b) represents the thickness of the plastic part in a direction parallel to the transferred surfaces.

The values of the thicknesses (a) and (b) are not particularly limited, and for example, (a) is 5 mm and (b) is 10 mm.

Next, a method for preparing the molded plastic part 10, which is an example of the method for molding a plastic part of the present invention, will be described.

Figure 2A:
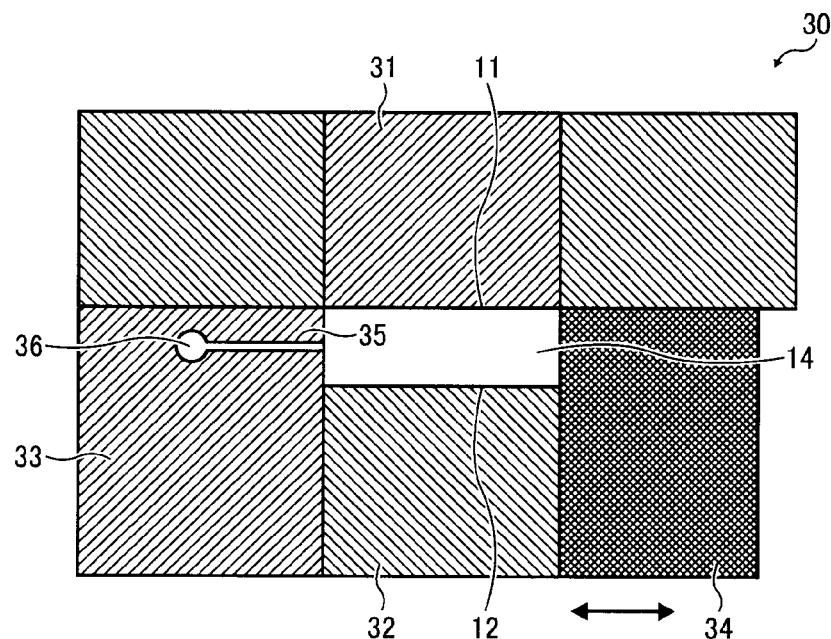
FIGS. 2A and 2B are cross sections illustrating a die for use in preparing the plastic part illustrated in FIG. 1.
Figure 2B:
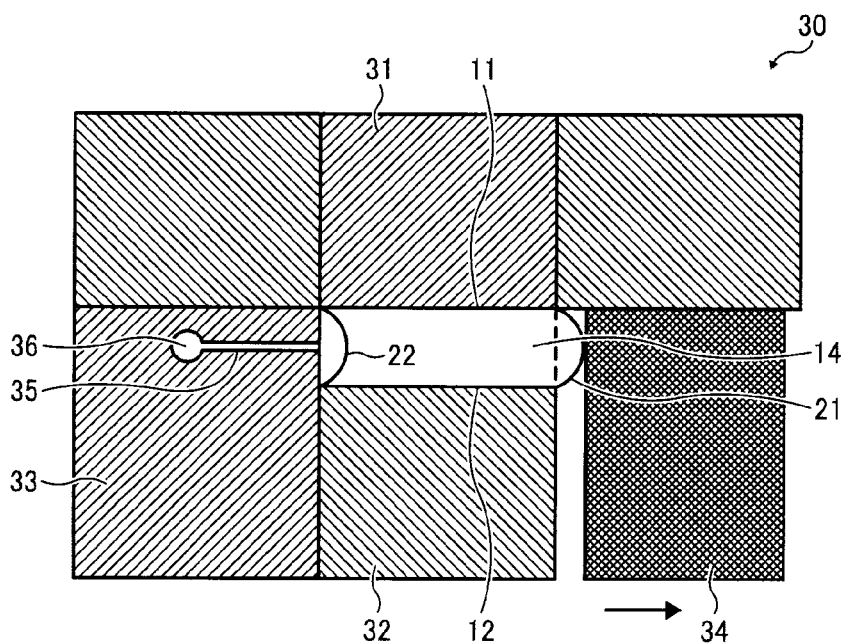

FIGS. 2A and 2B illustrate cross sections of a die 30 for use in molding the plastic part 10, and the cross section 14 of the plastic part (i.e., injected resin).

The die 30 has a pair of upper and lower portions to form an openable/closable cavity therein, into which a melted resin is to be injected. The cavity is defined by transfer wall surfaces of transfer cavity pieces 31 and 32 for transferring the wall surface to the injected resin, and side wall surfaces 33 and 34 of imperfect transfer cavity pieces.

The imperfect transfer cavity piece 33 has an air slit 35 serving as an air supplying portion, and an air hole 36 connected with the air slit. The air hole 36 is connected with a gas compressing device such as compressors to feed compressed air to one side of the cavity (i.e., injected resin).

The other imperfect transfer cavity piece 34 is a movable cavity piece, which is slidable in such directions as indicated by an arrow in FIG. 2A. After the movable cavity piece 34 is contacted with the cavity piece 32 to form the cavity as illustrated in FIG. 2A and a resin is injected into the cavity, the resin in the cavity starts to solidify while being contacted with all the wall surfaces of the cavity and generating an internal pressure therein.

Next, at a time in which a predetermined period of time passes after injection of the melted resin and the resin does not yet solidify and can flow while keeping the internal pressure, compressed air is fed to the cavity through the air slit 35. In this regard, the proper air feeding time is determined depending on the thermal properties of the resin used.

Next, as illustrated in FIG. 2B, the movable cavity piece 34 is slid in such a direction (indicated by an arrow) as to be separated from the cavity. In this regard, since the volume of the cavity is increased by the movement (retreating) of the movable cavity piece 34, the melted resin in the cavity also causes volume expansion, resulting in formation of the imperfectly transferred convex portion 21 on a surface of the resin facing the movable cavity piece 34. In addition, the internal pressure of the resin rapidly decreases due to the volume expansion of the resin, thereby decreasing the adhesion of the resin to the wall surfaces of the cavity. In this regard, the resin is initially released from the imperfect transfer cavity piece 33, at which the resin is pressed by compressed air fed from the air slit 35, and the imperfectly transferred concave portion 22 is formed on a surface of the resin.

Even when the volume of the resin becomes relatively small compared with the volume of the cavity due to retreating of the movable cavity piece 34, and volume reduction is caused due to acceleration of cooling and solidification of the resin, the volume reduction can be absorbed by the imperfectly transferred portions 21 and 22 because the portions can move freely. In other words, by using this method, defective transfer is caused only on the imperfectly transferred portions 21 and 22, and formation of a sink on the first and second transferred surfaces 11 and 12 can be prevented. In addition, the internal pressure of the resin generated by injection of the resin can be substantially cancelled by expansion of the volume of the cavity due to the retreating of the movable cavity piece 34, thereby decreasing the internal stress and internal strain of the resultant plastic part 10 so as to be substantially zero. Therefore, the resultant plastic part 10 has transferred surfaces with good dimensional precision and does not induce the birefringence phenomenon.

Next, another method for molding the plastic part illustrated in FIG. 1 will be described by reference to FIGS. 3A and 3B.

Figure 3A:
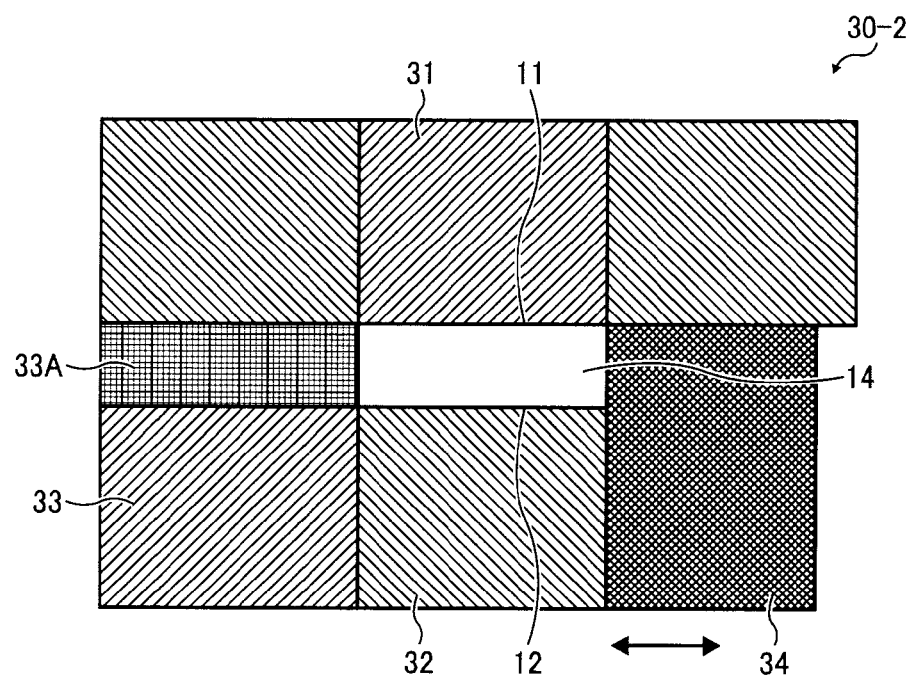
FIGS. 3A and 3B are cross sections illustrating another die for use in preparing the plastic part illustrated in FIG. 1.
Figure 3B:
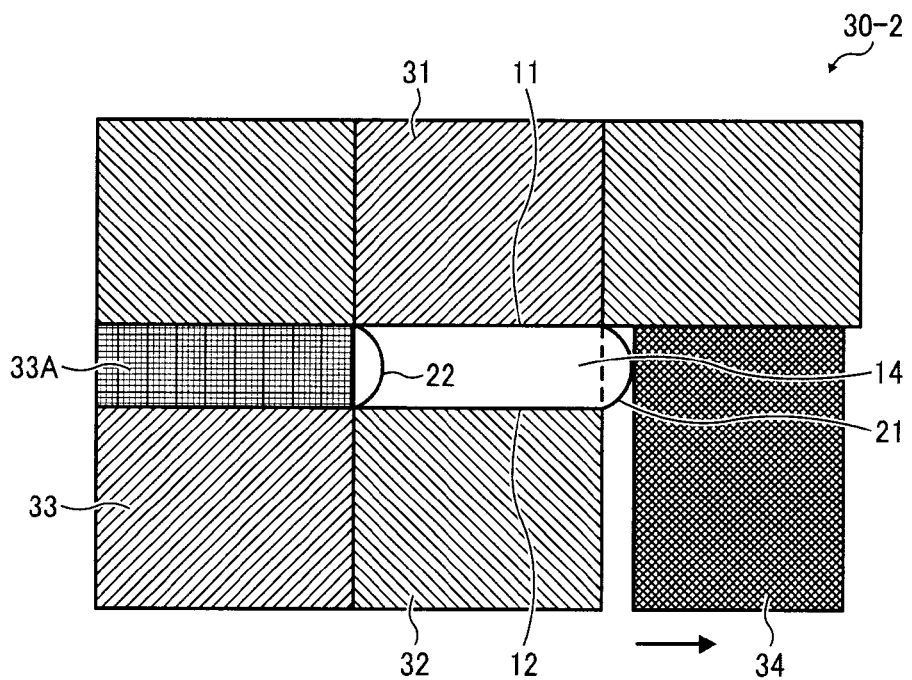

FIGS. 3A and 3B illustrate cross sections of a die 30-2 for use in molding the plastic part 10 illustrated in FIG. 1, and the cross section 14 of the plastic part (i.e., injected resin).

Referring to FIGS. 3A and 3B, the die 30-2 has a pair of upper and lower portions to form an openable/closable cavity therein, into which a melted resin is to be injected. The cavity is defined by the transfer wall surfaces of the transfer cavity pieces 31 and 32, and the surfaces of the imperfect transfer cavity piece 33 including a fixed cavity piece 33A and the imperfect transfer cavity piece 34 (i.e., the movable cavity piece), which serve as side walls of the cavity.

The surface of the fixed cavity piece 33A contacting the melted resin is made of a release material having a relatively low adhesion to the resin compared to the materials of the surfaces of the other walls of the cavity. Namely, the surface of the fixed cavity piece 33A is a priority release surface. Specific examples of such a release material include titanium nitride (TiN), titaniumcyanide (TiCN), metals including a TEFLON® resin, etc. In this example, the surface of the fixed cavity piece 33A is subjected to a surface treatment using such a release material so that the injected resin can be released from the surface of the fixed cavity piece by priority.

Similarly to the die 30 illustrated in FIGS. 2A and 2B, the movable cavity piece 34, which is slidable in such directions as indicated by an arrow in FIG. 3A, serves as the other side wall of the die 30-2 illustrated in FIGS. 3A and 3B.

After the movable cavity piece 34 is contacted with the cavity piece 32 to form the cavity as illustrated in FIG. 3A and a resin is injected into the cavity, the resin in the cavity starts to solidify while contacted with all the walls of the cavity and generating an internal pressure therein.

Next, at a time in which a predetermined period of time passes after injection of the melted resin and the resin does not yet solidify and can flow while keeping the internal pressure, the movable cavity piece 34 is slid in such a direction (indicated by an arrow) as to be separated from the cavity as illustrated in FIG. 3B. In this regard, the movable cavity piece sliding time is determined depending on the thermal properties of the resin used and the release property of the material constituting the surface of the fixed cavity piece 33A.

In this regard, since the volume of the cavity is increased by the retreating of the movable cavity piece 34, the melted resin in the cavity also causes volume expansion, resulting in formation of the imperfectly transferred convex portion 21 on the surface of the resin facing the movable cavity piece 34. In addition, the internal pressure of the resin rapidly decreases due to the volume expansion of the resin, thereby decreasing the adhesion of the resin to the wall surfaces of the cavity. In this regard, the resin is initially released from the surface of the fixed cavity piece 33A having higher releasability and the imperfectly transferred concave portion 22 is formed on a surface of the resin.

Even when the volume of the resin becomes relatively small compared with the volume of the cavity due to retreating of the movable cavity piece 34, and volume reduction is caused due to acceleration of cooling and solidification of the resin, the volume reduction can be absorbed by the imperfectly transferred portions 21 and 22 because the portions can move freely. In other words, by using this method, defective transfer is caused only on the imperfectly transferred portions 21 and 22, and formation of a sink on the first and second transferred surfaces 11 and 12 can be prevented. In addition, the internal pressure of the resin formed by injection of the resin can be substantially cancelled by expansion of the volume of the cavity due to the retreating of the movable cavity piece 34, thereby decreasing the internal stress and internal strain of the resultant plastic part 10 so as to be substantially zero. Therefore, the resultant plastic part 10 has transfer surfaces with good dimensional precision and does not induce the birefringence phenomenon.

The shape of the cavity of the above-mentioned dies (i.e., the shape of the molded plastic part 10 mentioned above) is one example, and is not limited thereto. By using the above-mentioned molding methods for other dies having different cavities, plastic parts of various shapes can be prepared.

Although the imperfectly transferred convex portion 21 faces the concave imperfect transfer portion 22 in the dies 30 and 30-2 illustrated in FIGS. 2 and 3, the convex and concave portions 21 and 22 do not necessarily face each other. For example, it is possible to provide a movable cavity piece as a side wall of a die, which faces the side surface 23 of the plastic part 10, so that an imperfectly transferred convex portion is formed on the side surface 23 of the plastic part. In addition, when molding a plastic part using the method of the present invention, it is necessary to form at least one imperfectly transferred convex portion and at least one imperfectly transferred concave portion. In this regard, the number of imperfectly transferred convex portions is not necessarily the same as the number of imperfectly transferred convex portions when molding a plastic part (for example, it is possible to form two imperfectly transferred convex portions and one imperfectly transferred concave portion). By forming imperfectly transferred portions having a wide area or three or more imperfectly transferred portions, defective transfer can be certainly induced only on the imperfectly transferred portions, thereby enhancing the transferability of the transfer wall surfaces of the cavity.

The method for injecting a resin, the method for generating pressure in an injected resin, and the method for forming an imperfectly transferred portion are not limited to the methods mentioned above.

Next, a second example of the molded plastic part of the present invention will be described. Hereinafter, the differences between the second example and the first example mentioned above will be mainly described.

In the first example, convex and concave portions are formed on different imperfectly transferred surfaces. However, the positions of the convex and concave portions are not limited thereto, and it is also preferable to form convex and concave portions on the same imperfectly transferred surface of a resin.

Figure 4:
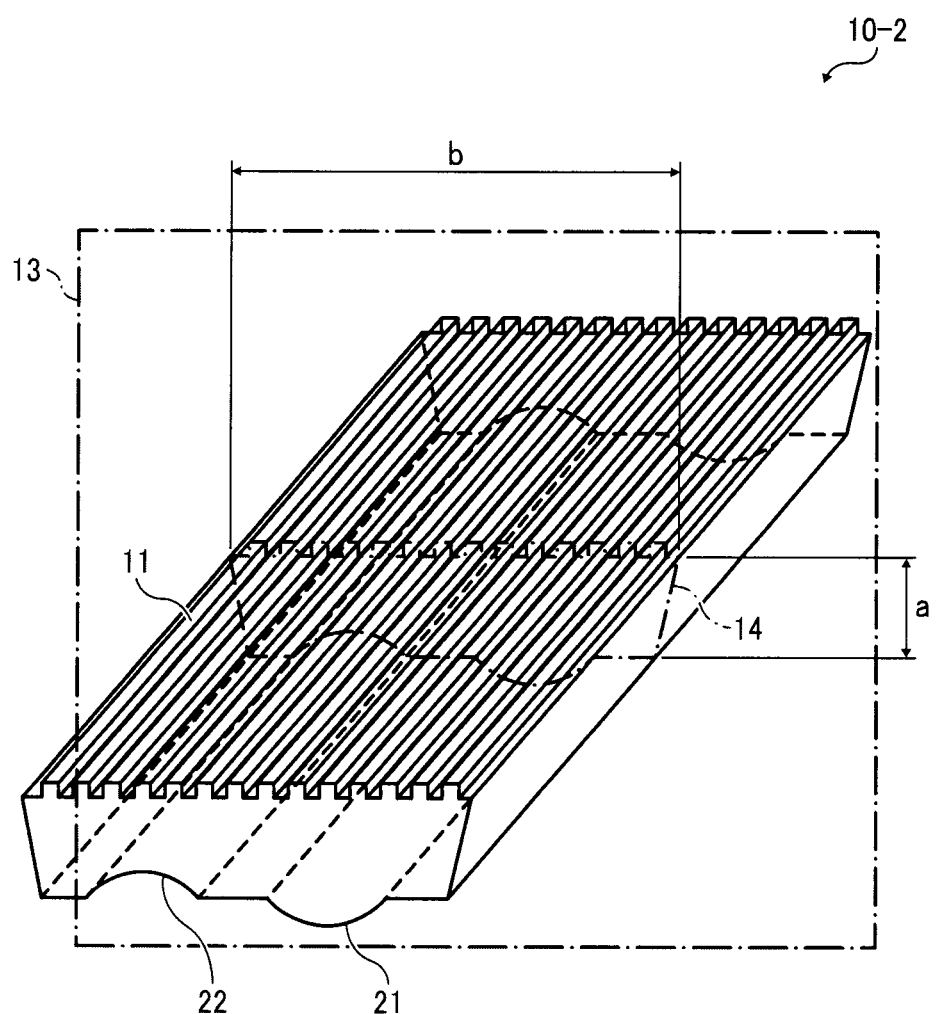
FIG. 4 is a perspective view illustrating another example of the molded plastic part of the present invention.

FIG. 4 is a perspective view illustrating the second example of the molded plastic part of the present invention. Referring to FIG. 4, a molded plastic part 10-2 has a transferred surface 11 having multiple convexes and concaves on the upper surface thereof, and the imperfectly transferred convex portion 21 and the imperfectly transferred concave portion 22 on the lower surface thereof. The molded plastic part 10-2 is a thin-walled plastic part, and the cross section 14 of the plastic part on the plane 13 perpendicular to the transfer surface 11 satisfies the relation (1) (i.e., (a)/(b)<1).

Next, a method for molding the plastic part 10-2 will be described.

Figure 5A:
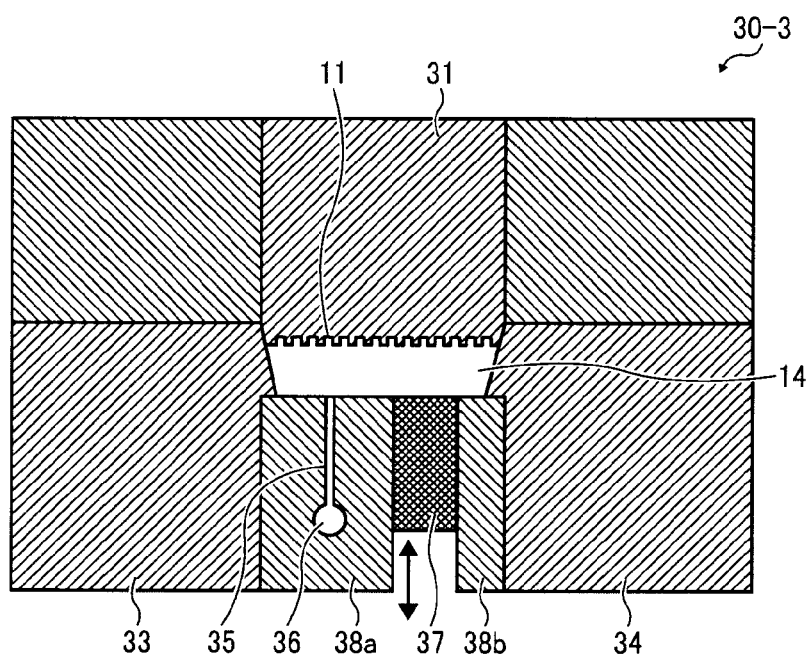
FIGS. 5A and 5B are cross sections illustrating a die for use in preparing the plastic part illustrated in FIG. 4.
Figure 5B:
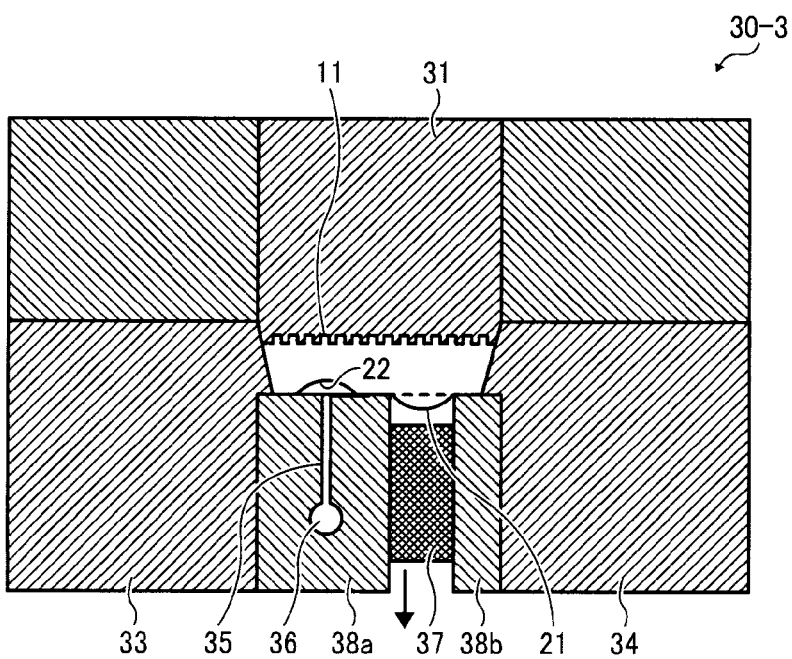

FIGS. 5A and 5B illustrate cross sections of a die 30-3 for use in molding the plastic part 10-2 illustrated in FIG. 4, and the cross section 14 of the plastic part (i.e., injected resin).

Referring to FIGS. 5A and 5B, the die 30-3 has a pair of upper and lower portions to form an openable/closable cavity therein, into which a melted resin is to be injected. The cavity is defined by the transfer wall surface of the upper cavity piece 31 and a wall surface of a bottom cavity piece 38 including first and second bottom cavity pieces 38a and 38b, and the side wall surfaces of the cavity pieces 33 and 34. The first bottom cavity piece 38a includes the air slit 35 and the air hole 36 connected with the air slit and an external compressor (not shown) to feed compressed air to the lower side of the cavity (i.e., injected resin). In addition, a movable cavity piece 37, which can move in directions indicated by an arrow in FIG. 5A, also constitutes a part of the bottom wall surface of the cavity.

After the movable cavity piece 37 is set so as to constitute the bottom wall together with the cavity pieces 38a and 38b to form the cavity as illustrated in FIG. 5A and a resin is injected into the cavity, the resin in the cavity starts to solidify while contacted with all the walls of the cavity and generating a pressure therein.

Next, at a time in which a predetermined period of time passes after injection of the melted resin and the resin does not yet solidify and can flow while keeping the internal pressure, compressed air is fed to the cavity through the air slit 35.

Next, as illustrated in FIG. 5B, the movable cavity piece 37 is slid (retreated) in such a direction (indicated by an arrow) as to be separated from the cavity. In this regard, since the volume of the cavity is increased by the retreating of the movable cavity piece 37, the melted resin in the cavity also causes volume expansion, resulting in formation of the imperfectly transferred convex portion 21 on a surface of the resin facing the movable cavity piece 37. In addition, the internal pressure of the resin rapidly decreases due to the volume expansion of the resin, thereby decreasing the adhesion of the resin to the wall surfaces of the cavity. In this regard, the resin is initially released from the surface of the first bottom cavity piece 38a, at which the resin is pressed by compressed air fed from the air slit 35, and the imperfectly transferred concave portion 22 is formed thereon.

Similarly to the first example, in the second example, by using an injection molding method using such a die as illustrated in FIGS. 5A and 5B, the imperfectly transferred convex and concave portions 21 and 22 can be formed on the bottom side of the plastic part without forming a sink on the transferred surface 11 and without keeping the internal pressure in the resin. Therefore, the transferred surface 11 of the resultant molded plastic part has a good dimensional precision and the plastic part has little internal strain. Particularly, since the transferred surface 11 of the second example 10-2 of the plastic part illustrated in FIG. 4 has fine convex and concave portions, it is necessary to increase the internal pressure of the injected resin so that the transfer surface of the upper cavity piece 31 can be satisfactorily transferred onto the injected resin. By using this molding method, the internal pressure can be reduced even after the transfer surface of the upper cavity piece 31 is transferred at a high internal pressure, thereby forming a plastic part having no residual internal stress. Therefore, deformation of the molded plastic part 10-2 caused when or after the plastic part is released from the die 30-3 can be prevented.

The shapes of the surfaces of the molded plastic part 10-2 illustrated in FIG. 4 are not particularly limited except for the transfer surface 11. Namely, the imperfectly transferred convex and concave portions 21 and 22 may be formed on another surface of the plastic part. In addition, the numbers of the imperfectly transferred convex and concave portions 21 and 22 are not particularly limited, and two or more imperfectly transferred convex and concave portions may be formed.

The method for forming the molded plastic part 10-2 is not limited to the method mentioned above, and the second method mentioned above for use in molding the first example 10 of the plastic part illustrated in FIG. 1, which uses a cavity piece having a surface with higher releasability, can also be used.

As mentioned above, by using the molding method of the present invention, plastic parts having a high-precision mirror surface or a surface having fine convex and concave portions can be prepared at low costs.

Next, a third example of the molded plastic part of the present invention will be described. Hereinafter, the differences between the third example and the first and second examples will be mainly described.

Figure 6:
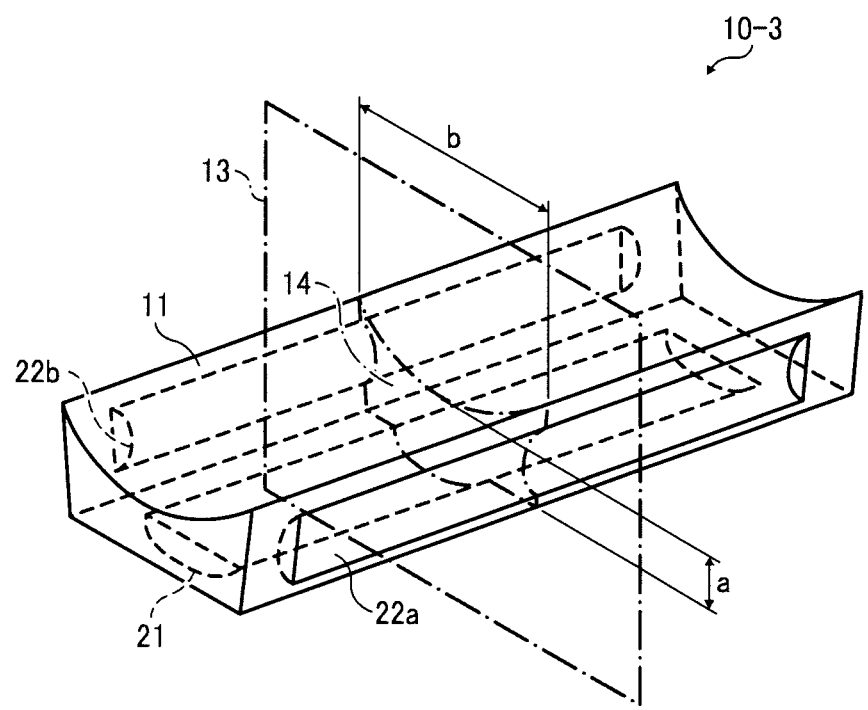
FIG. 6 is a perspective view illustrating another example of the molded plastic part of the present invention.

Referring to FIG. 6, a molded plastic part 10-3 has a concave transferred concave surface 11 on the upper side thereof, the imperfectly transferred convex portion 21 on the bottom side thereof, and imperfectly transferred concave portions 22a and 22b on the two longer side surfaces thereof. The molded plastic part 10-3 is a thin-walled plastic part, and the cross section 14 of the plastic part on the plane 13 perpendicular to the transferred surface 11 satisfies the relation (1) (i.e., (a)/(b)<1).

Next, a method for molding the plastic part 10-3 will be described.

Figure 7A:
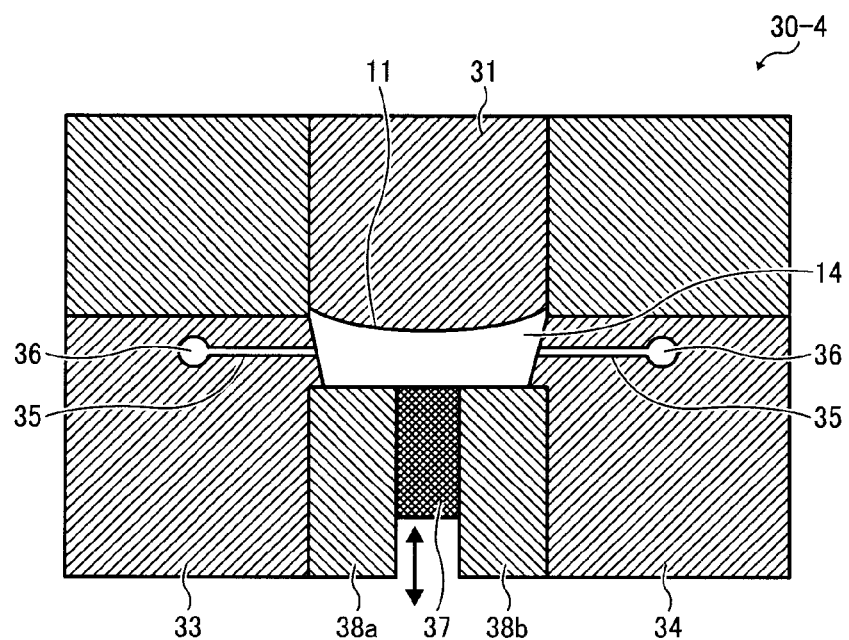
FIGS. 7A and 7B are cross sections illustrating a die for use in preparing the plastic part illustrated in FIG. 6.
Figure 7B:
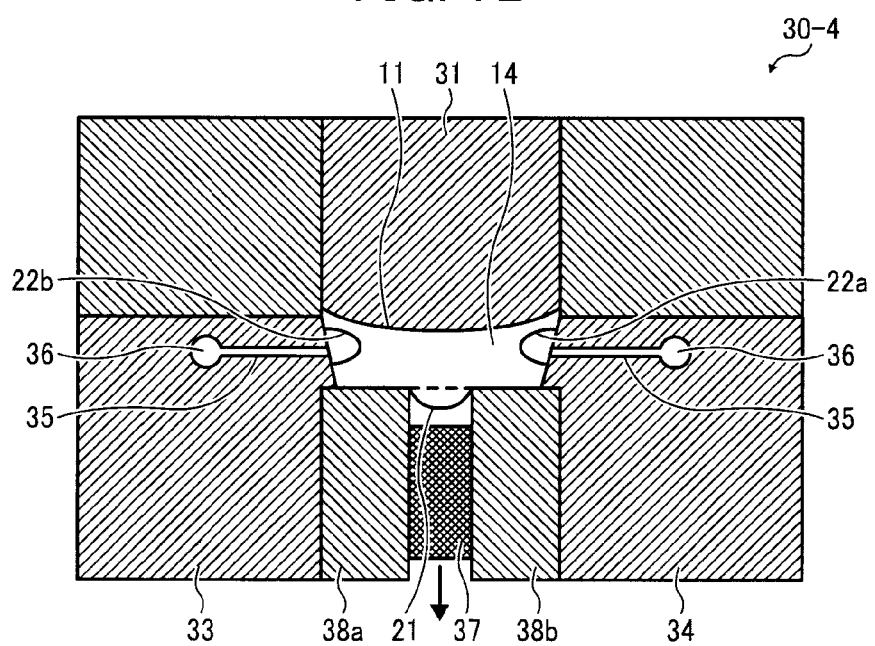

FIGS. 7A and 7B illustrate cross sections of a die 30-4 for use in molding the plastic part 10-3 illustrated in FIG. 6, and the cross section 14 of the plastic part (i.e., injected resin).

Referring to FIGS. 7A and 7B, the die 30-4 has a pair of upper and lower portions to form an openable/closable cavity therein, into which a melted resin is to be injected. The cavity is defined by the transfer wall surface of the upper cavity piece 31, the wall surface of the bottom cavity piece 38 including the first and second bottom cavity pieces 38a and 38b, and the side wall surfaces of the cavity pieces 33 and 34. Each of the cavity pieces 33 and 34 includes the air slit 35 and the air hole 36 connected with the air slit and an external compressor (not shown) to feed compressed air to both the side portions of the cavity (injected resin). In addition, the movable cavity piece 37, which can move in directions indicated by an arrow in FIG. 7A, also constitutes a part of the bottom wall surface.

After the movable cavity piece 37 is set so as to constitute the bottom wall surface together with the cavity pieces 38a and 38b to form the cavity as illustrated in FIG. 7A and a resin is injected into the cavity, the resin in the cavity starts to solidify while contacted with all the wall surfaces of the cavity and generating a pressure therein.

Next, at a time in which a predetermined period of time passes after injection of the melted resin and the resin does not yet solidify and can flow while keeping the internal pressure, compressed air is fed to the cavity through the air slits 35 and 35.

Next, as illustrated in FIG. 7B, the movable cavity piece 37 is slid in such a direction (indicated by an arrow) as to be separated from the cavity. In this regard, since the volume of the cavity is increased by the retreating of the movable cavity piece 37, the melted resin in the cavity also causes volume expansion, resulting in formation of the imperfectly transferred convex portion 21 on a bottom surface of the resin facing the movable cavity piece 37. In addition, the internal pressure of the resin rapidly decreases due to the volume expansion of the resin, thereby decreasing the adhesion of the resin to the wall surfaces of the cavity. In this regard, the resin is initially released from the side wall surfaces 33 and 34, at which the resin is pressed by compressed air fed from the air slit 35, and the imperfectly transferred concave portions 22a and 22b are formed on the longer side surfaces of the plastic part.

Similarly to the first and second examples, in this third example, by using an injection molding method using such a die as illustrated in FIGS. 7A and 7B, the imperfectly transferred convex portion 21 is formed on the bottom surface of the plastic part and the imperfectly transferred concave portions 22a and 22b are formed on the longer side surfaces of the plastic part without forming a sink on the transferred surface 11 and without keeping the internal pressure in the resin. Therefore, the transferred surface 11 of the resultant molded plastic part has a good dimensional precision while having little internal strain.

Next, a fourth example of the molded plastic part of the present invention will be described. Hereinafter, the differences between the fourth example and the first to third examples will be mainly described.

Figure 8:
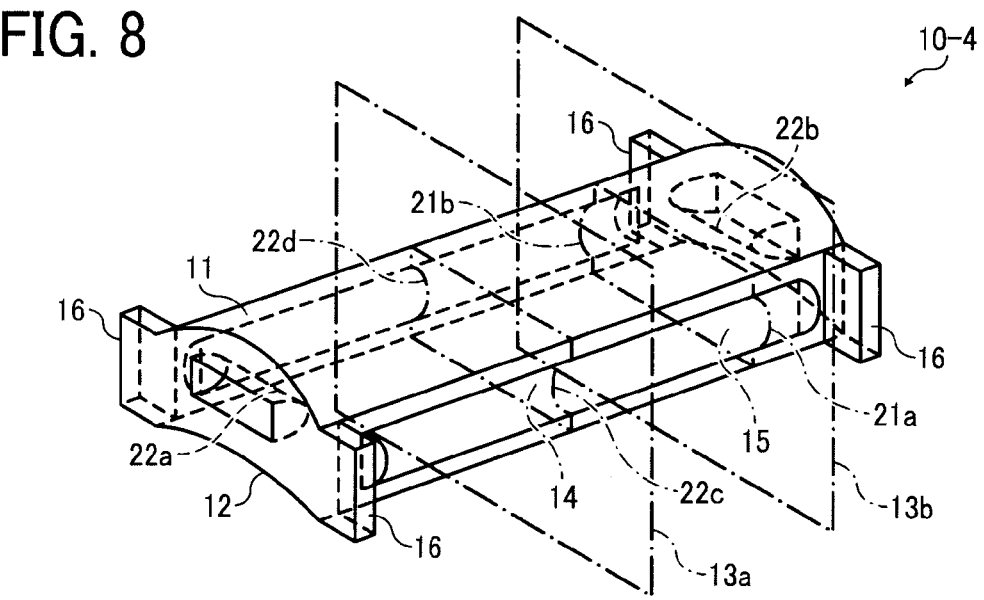
FIG. 8 is a perspective view illustrating another example of the molded plastic part of the present invention.
Figure 9A:
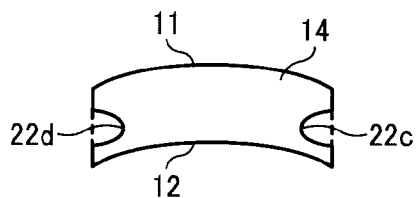
FIGS. 9A and 9B are cross sections illustrating the plastic part illustrated in FIG. 8.
Figure 9B:
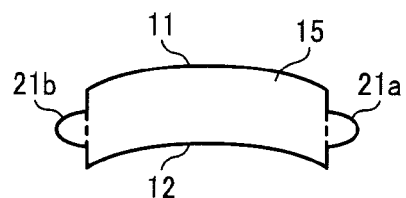
Figure 10A:
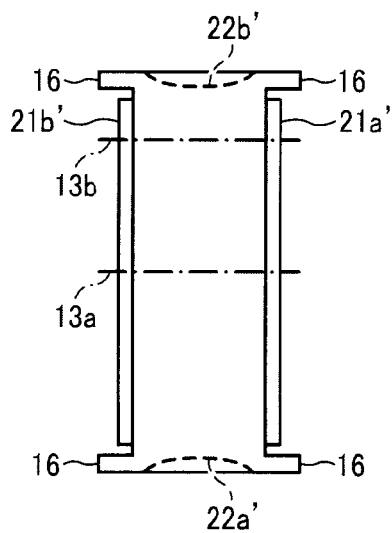
FIGS. 10A and 10B are plan views illustrating the plastic part illustrated in FIG. 8.
Figure 10B:
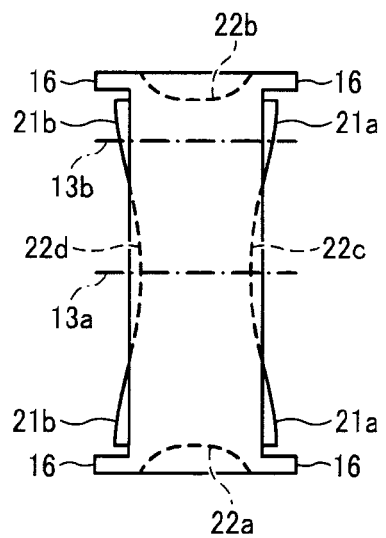

FIG. 8 is a perspective view illustrating the fourth example 10-4 of the molded plastic part of the present invention. Referring to FIG. 8, a molded plastic part 10-4 has the transferred surfaces 11 and 12 on the upper and bottom sides thereof, respectively, and imperfectly transferred convex and concave portions on both the longer and shorter sides thereof. FIGS. 9A and 9B illustrate cross sections 14 and 15 of the molded plastic part 10-4 on planes 13a and 13b, respectively. FIGS. 10A and 10B are plan views illustrating the molded plastic part 10-4. FIG. 10A illustrates the molded plastic part at a time, in which a movable cavity piece is just slid, thereby reducing the internal pressure and in which the injected resin does not yet solidify. FIG. 10B illustrates the molded plastic part after the resin solidifies.

Referring to FIG. 8, the molded plastic part 10-4 has imperfectly transferred convex portions 21a and 21b on the longer side surfaces thereof, and imperfectly transferred concave portions 22a and 22b on the shorter side surfaces thereof. In this regard, the imperfectly transferred convex portions 21a and 21b are formed on the surfaces of the end portions of the longer sides of the plastic part as illustrated in FIG. 9B, and imperfectly transferred concave portions 22c and 22d are formed on the surfaces of the central portions of the longer sides as illustrated in FIG. 9A. In this regard, the imperfectly transferred convex portions 21a and 21b are gradually changed to the imperfectly transferred concave portions in a direction of from the end portions to the central portions as illustrated in FIG. 10B.

The molded plastic part 10-4 has plate-shaped reference portions 16, which serve as reference planes used when the plastic part is attached to another part and which are prepared by transferring transfer surfaces of a die to the injected resin. In addition, the molded plastic part 10-4 is a thin-walled plastic part, and the cross sections 14 and 15 of the plastic part on the planes 13a and 13b perpendicular to the transferred surface 11 satisfies the relation (1) (i.e., (a)/(b)<1).

The plastic part 10-4 can be prepared by using the methods mentioned above. Specifically, each of the imperfectly transferred convex portions 21a and 21b can be formed using a movable cavity piece such as the movable cavity piece 37, and each of the imperfectly transferred concave portions 22a and 22b can be formed by feeding compressed air using the air slit 35. By using this method, at a time just after the movable cavity piece is moved so as to separated from the cavity, flat convex portions 21a' and 21b' are formed on the surfaces of the respective longer sides of the plastic part 10-4 as illustrated in FIG. 10A due to volume expansion of the resin. In addition, concave portions 22a' and 22b' are formed on the surfaces of the respective shorter sides of the plastic part 10-4 as illustrated in FIG. 10A.

However, when the resin having such a shape as illustrated in FIG. 10A is cooled and solidifies, the resin causes volume contraction, and the imperfectly transferred concave portions 22a' and 22b' move as free surfaces to absorb the volume contraction of the resin at the end portions of the plastic part 10-4, resulting in formation of the deeper concave portions 22a and 22b as illustrated in FIG. 10B. By contrast, in the central portions of the plastic part 10-4, the imperfect transfer convex portions 21a' and 21b' absorb volume contraction of the resin and therefore the central portions of the imperfect transfer convex portions 21a' and 21b' change to the imperfectly transferred concave portion 22c and 22d.

As a result, each of the imperfectly transferred portions 21 formed by the movable cavity pieces has such a curved surface that a convex portion is gradually changed to a concave portion in the direction of from the end portions to the central portions as illustrated in FIG. 10B.

Thus, by forming imperfectly transferred convex portions using movable cavity pieces while forming imperfectly transferred concave portions using air slits, the fourth example of the molded plastic part can be molded without forming a sink on the transferred surfaces 11 and 12 and without keeping the internal pressure in the resin. Therefore, the resultant molded plastic part has transferred surfaces with good dimensional precision while having little internal strain.

In this regard, the imperfectly transferred convex and concave portions 21 and 22 of the molded plastic part are free surfaces, which are not formed by transferring the transfer wall surfaces of the cavity. Therefore, there is a case in which the molded plastic part is misaligned in a device, resulting in deterioration of precision of the plastic part. Therefore, the fourth example 10-4 of the plastic part has the plate-shaped reference portions 16, which are provided at both the end portions of the plastic part so as to serve as reference planes and which are higher in level than the imperfectly transferred convex portions 21a and 21b. By forming such reference portions, the plastic part can be stably positioned with precision in a device.

Since the internal stress caused in the plate-shaped reference portions 16 when the plastic part is molded can be reduced by forming the convex and concave portions 21 and 22, the plate-shaped reference portions 16 also have good dimensional precision. The position, shape, and number of the reference portions are not particularly limited, but the reference portions are formed on a surface other than the transferred surfaces of a molded plastic part.

The thus molded plastic part can be preferably used as an optical element (such as plastic lenses and plastic mirrors), wherein at least one of the transferred surfaces of the plastic part is used as an optical mirror surface of the optical element. Plastic parts used as optical elements are required to have high dimensional precision and little internal strain. Since the above-mentioned molded plastic part of the present invention has little residual internal stress, the plastic part has little internal strain. By using such a plastic part as an optical element, the optical element hardly induces the birefringence phenomenon. In addition, by forming a reference portion (plane) on the plastic part, the optical element can be precisely positioned in a device, and thereby the optical property of the optical element can be fully exhibited.

For example, the molded plastic part 10-2 illustrated in FIG. 4 can be used as an optical mirror, wherein the transferred surface 11 serves as an optical mirror surface. The optical mirror can constitute a diffraction grating exhibiting a fine scattering effect. In addition, the molded plastic part 10-3 illustrated in FIG. 6 can be used as a plastic mirror, wherein the transferred surface 11 serves as a concave mirror surface. Further, the molded plastic part 10-4 illustrated in FIG. 8 can be used as a plastic lens, wherein the transferred surface 11 serves as an optical mirror surface (e.g., an entrance surface) and the transferred surface 12 also serves as an optical mirror surface (e.g., an exit surface).

Next, the optical scanning device of the present invention will be described.

Since the molded plastic part of the present invention has a transferred surface having good dimensional precision while having little internal strain, optical elements, to which the molded plastic part is applied, have good optical property and hardly induces the birefringence phenomenon.

For example, in plastic lenses prepared by general molding methods, internal strain is eccentrically present in certain portions of the plastic lenses. Therefore, in an optical scanning device using such a plastic lens, the positions in the sub-scanning direction of multiple light beams passing through the plastic lens vary (i.e., the multiple light beams induce different birefringences), resulting in variation of strength and polarization property of the multiple light beams. However, when the molded plastic part of the present invention is used as a plastic lens of an optical scanning device, the plastic lenses can exhibit good optical property because of having little internal strain.

Figure 11:
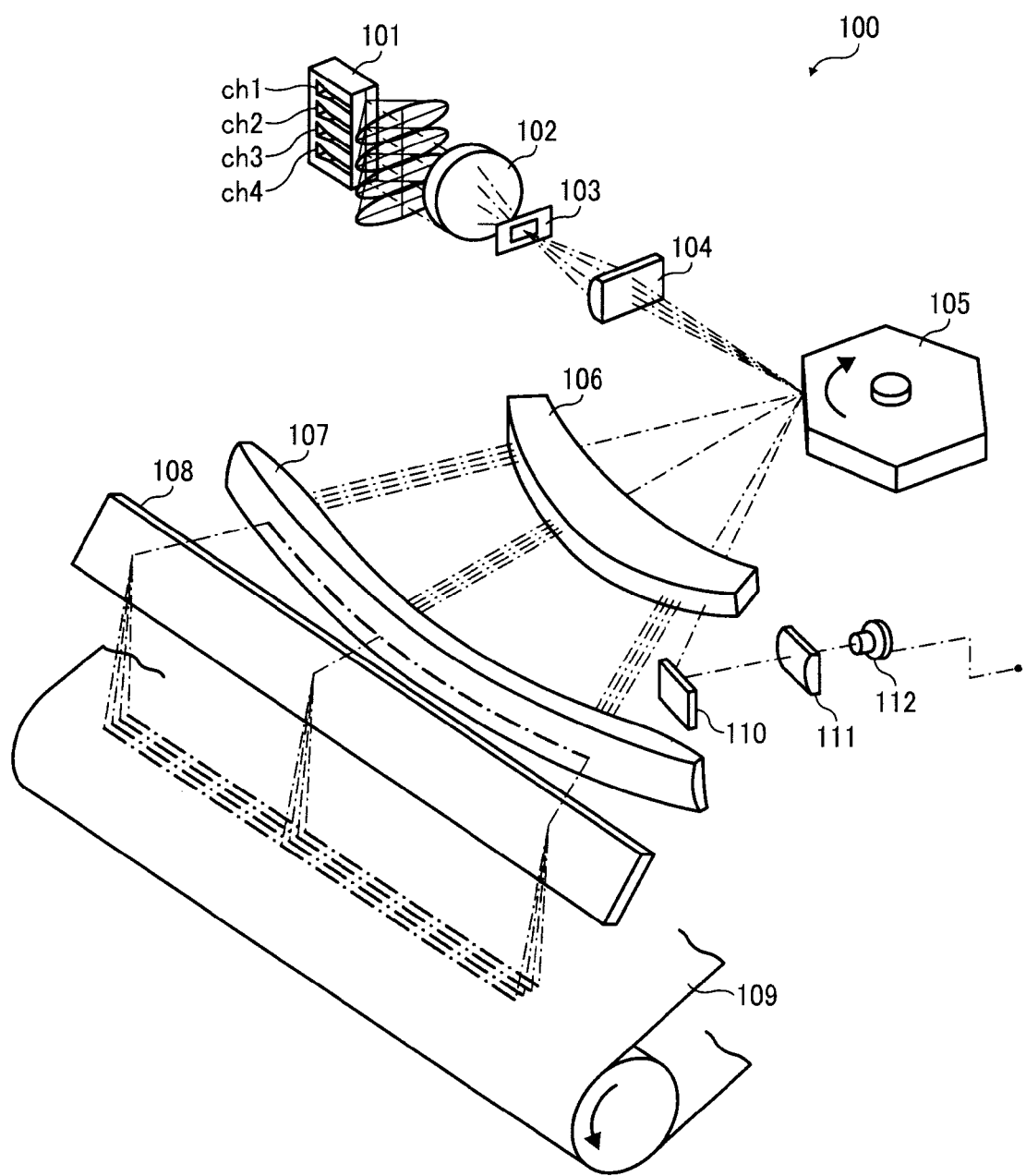
FIG. 11 is a schematic view illustrating an example of the optical scanning device of the present invention.

FIG. 11 illustrates a multi-beam optical scanning device as an example of the optical scanning device of the present invention.

Referring to FIG. 11, a multi-beam optical scanning device 100 includes multiple light sources 101 (ch1 to ch4) configured to emit multiple light beams; a common coupling lens 102 configured to couple the light beams; a common cylindrical lens 104 configured to focus the coupled light beams on a surface of a deflecting member 105 so as to be aligned multiple light beams, which are aligned so as to extend in the main scanning direction while being separated from each other in the sub-scanning direction; the deflecting member 105 configured to deflect the light beams at a constant angular velocity; common optics (such as a combination of a first scanning lens 106 and a second scanning lens 107) configured to guide the deflected light beams; and a mirror 108 configured to change the light paths of the multiple light beams so that multiple light spots are formed on a surface of an image bearing member 109 (such as a photoreceptor) while separated from each other in the sub-scanning direction. Thus, the surface of the image bearing member 109 is scanned with multiple scanning lines at the same time. Reference numeral 103 denotes an aperture configured to cut the peripheral portion of the light beams to reshape the light beams. In this regard, one of the multiple light beams is incident to a mirror 110 to be reflected, and the reflected light beam is guided to a light-sensitive element 112 by a lens 111 so that the start time of an optical writing operation is determined depending on the output from the light-sensitive element 112.

Since the plastic lens prepared by using the molding method of the present invention is a thin-walled lens, the plastic lens is preferably used as the second scanning lens 107.

As mentioned above, optical elements prepared by the molding method of the present invention has little internal strain, and therefore light beams passing through the optical elements hardly induce the birefringence phenomenon (i.e., the optical properties of the light beams are substantially the same) regardless of the positions in the sub-scanning direction of the optical elements through which the light beams pass. Therefore, by using such optical elements for multi-beam optical scanning devices, good effects can be produced.

The present invention has been described by reference to several examples, but the present invention is not limited thereto. For example, the molded plastic part can also be preferably used for exterior components of electronic devices such as mobile phones.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2010-001272, filed on Jan. 6, 2010, the entire contents of which are herein incorporated by reference.

What is claimed is:

1. A molded plastic part, which is prepared by injecting a resin in a cavity of a die so that a pressure is generated in the resin in the cavity and at least one transfer wall surface of the cavity is transferred to the resin, comprising:

at least one transferred surface;

a first imperfectly transferred concave portion on a first surface thereof other than the at least one transferred surface;

a second imperfectly transferred concave portion on a second surface thereof other than the at least one transferred surface; and at least one imperfectly transferred convex portion on the first surface thereof, the second surface thereof, or a third surface thereof other than the at least one transferred surface, wherein the molded plastic part satisfies a relation (a)/(b) <1, wherein (a) represents a thickness of the plastic part in a direction perpendicular to the at least one transferred surface, and (b) represents the thickness of the plastic part in a direction parallel to the at least one transferred surface.

2. The molded plastic part according to claim 1, including two opposed transferred surfaces.

3. The molded plastic part according to claim 1, wherein the thickness (a) is a minimum thickness of the plastic part in the direction perpendicular to the at least one transferred surface, and the thickness (b) is a maximum thickness of the plastic part in the direction parallel to the at least one transferred surface.

4. The molded plastic part according to claim 1, wherein the at least one imperfectly transferred convex portion is located on the third surface, and wherein the first and second surfaces are opposed to each other.

5. The molded plastic part according to claim 1, further comprising:

a reference portion configured to serve as a reference plane when the plastic part is attached to another part, wherein the reference portion has a transferred surface formed by transferring a transfer wall surface of the cavity.

6. The molded plastic part according to claim 1, wherein the at least one transferred surface of the plastic part includes a lens surface.

7. A multi-beam optical scanning device comprising:
a light source configured to emit multiple light beams;
a deflecting member configured to deflect the multiple light beams; and
a plastic part according to claim 6, through which the deflected multiple light beams pass while being scanned in a main scanning direction and separated from each other in a sub-scanning direction.

8. The molded plastic part according to claim 1, wherein the at least one imperfectly transferred convex portion is located on the first surface, and wherein the first and second surfaces are opposed to each other.

9. A molded plastic part, which is prepared by injecting a resin in a cavity of a die so that a pressure is generated in the resin in the cavity and at least one transfer wall surface of the cavity is transferred to the resin, comprising:

at least one transferred surface;

at least one imperfectly transferred concave portion on a first surface thereof other than the at least one transferred surface; and at least one imperfectly transferred convex portion on the first surface thereof or a second surface thereof other than the at least one transferred surface, wherein the molded plastic part satisfies a relation (a)/(b) <1, wherein (a) represents a thickness of the plastic part in a direction perpendicular to the at least one transferred surface, and (b) represents the thickness of the plastic part in a direction parallel to the at least one transferred surface, and wherein the at least one imperfectly transferred convex portion is located on the first surface.

10. The molded plastic part according to claim 9, wherein the at least one transferred surface of the plastic part includes a lens surface.

11. A multi-beam optical scanning device comprising:
a light source configured to emit multiple light beams;
a deflecting member configured to deflect the multiple light beams; and
a plastic part according to claim 10, through which the deflected multiple light beams pass while being scanned in a main scanning direction and separated from each other in a sub-scanning direction.

* * * * *